US008824618B2

(12) United States Patent
Matsumoto et al.

(10) Patent No.: US 8,824,618 B2
(45) Date of Patent: Sep. 2, 2014

(54) CONTROL ROD BLADE UNLATCHING TOOL

(75) Inventors: Jack Matsumoto, San Jose, CA (US);
Robert W. Whitling, Morgan Hill, CA (US); Christopher M. Welsh, Livermore, CA (US); Gregory A. Francisco, Glencoe, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1062 days.

(21) Appl. No.: 12/943,434

(22) Filed: Nov. 10, 2010

(65) Prior Publication Data

US 2012/0114090 A1    May 10, 2012

(51) Int. Cl.
*G21C 19/00*    (2006.01)
*G21C 19/32*    (2006.01)
*G21C 19/20*    (2006.01)

(52) U.S. Cl.
CPC .............. *G21C 19/32* (2013.01); *G21C 19/207* (2013.01); *G21Y 2004/40* (2013.01); *G21C 19/00* (2013.01)
USPC .......................................... 376/260; 414/146

(58) Field of Classification Search
CPC .. G21C 19/207; G21C 19/32; G21Y 2004/40; Y02E 30/40
USPC .......................................... 376/260; 414/146
See application file for complete search history.

(56) References Cited

U.S. PATENT DOCUMENTS

| | | | | |
|---|---|---|---|---|
| 4,302,176 A | * | 11/1981 | Gordon | 425/392 |
| 4,311,557 A | * | 1/1982 | Kowalski et al. | 376/271 |
| 4,907,834 A | * | 3/1990 | dejong et al. | 294/202 |
| 5,016,871 A | * | 5/1991 | Dalebout et al. | 482/5 |
| 5,377,239 A | * | 12/1994 | Nopwaskey et al. | 376/260 |
| 5,473,645 A | * | 12/1995 | Kowdley | 376/272 |
| 5,521,950 A | * | 5/1996 | Whitling | 376/260 |
| 5,549,636 A | * | 8/1996 | Li | 606/206 |
| 5,600,685 A | * | 2/1997 | Izzo et al. | 376/260 |
| 5,791,228 A | * | 8/1998 | Gervasi | 91/375 R |

(Continued)

FOREIGN PATENT DOCUMENTS

| | | |
|---|---|---|
| GB | 2072612 A | 10/1981 |
| JP | 51-96200 | 8/1976 |

(Continued)

OTHER PUBLICATIONS

"What is a Rotary Union?", Wisegeek article, Oct. 24, 2006.*

(Continued)

*Primary Examiner* — Frank J McGue
(74) *Attorney, Agent, or Firm* — Harness, Dickey & Pierce, PLC.

(57) ABSTRACT

Disclosed is an unlatching tool that may be used to unlatch a control rod from a control drive. The unlatching tool may include a baseplate, a first guide member and a second guide member attached to the baseplate, a first frame and a second frame attached to the baseplate, a stepper motor attached to the first frame, a worm drive attached to the first frame, a cable reel shaft attached to the first and second frame, a hose wrapped around the cable reel shaft, and a hook attached to a first end of the hose. The hook may include a cylindrical sleeve having a at least one finger configured to fold and unfold. Disclosed also is a method of unlatching a control rod from a control drive.

9 Claims, 16 Drawing Sheets

(56) References Cited

U.S. PATENT DOCUMENTS

| | | |
|---|---|---|
| 6,501,813 B1 | 12/2002 | Soma et al. |
| 2003/0052211 A1* | 3/2003 | Mancuso et al. ............ 242/422.5 |
| 2003/0178520 A1* | 9/2003 | Wivagg ...................... 242/378.2 |

FOREIGN PATENT DOCUMENTS

| | | |
|---|---|---|
| JP | 04-279897 | 10/1992 |
| JP | 07-072289 | 3/1995 |
| JP | 07-333388 | 12/1995 |
| JP | 2002-243889 | 8/2002 |
| JP | 2008-256586 | 10/2008 |

OTHER PUBLICATIONS

Japanese Office Action dated Feb. 4, 2014 issued in corresponding JP 2011-246272 (translation).

Jul 22, 2014 European Search Report issued in corresponding European Patent Application No. 11188457.3.

* cited by examiner

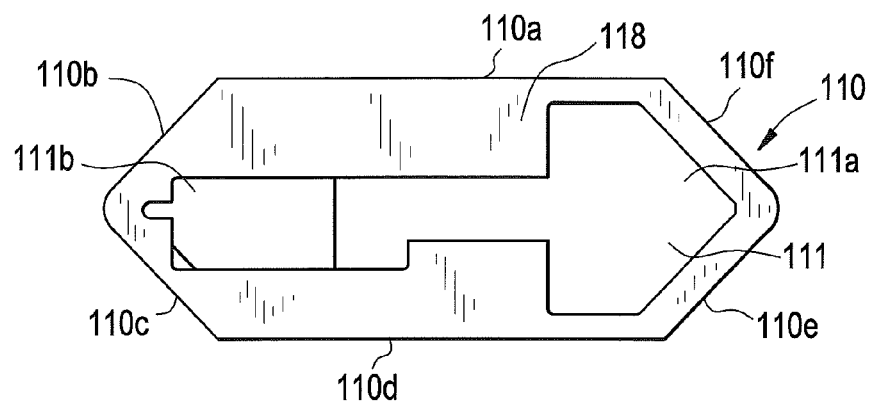
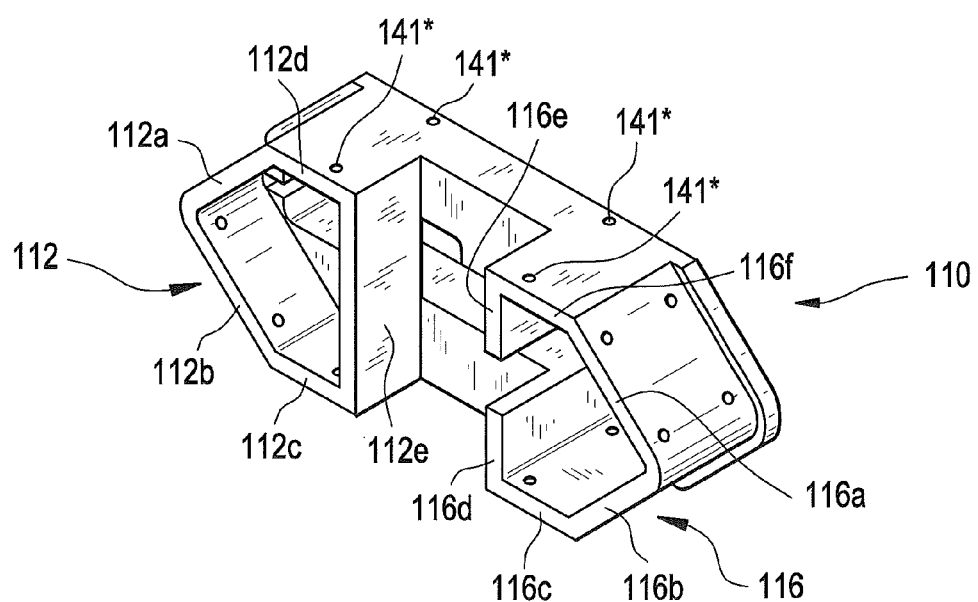

FIG. 15A
FIG. 15B
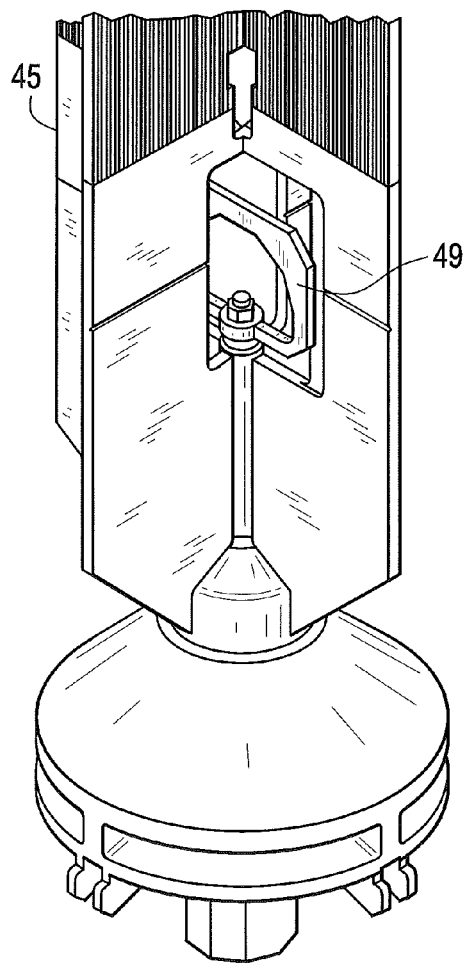
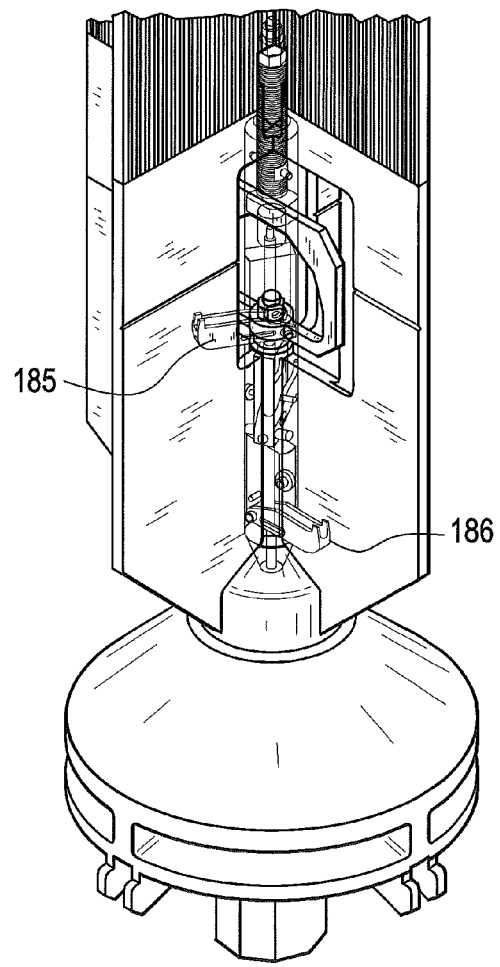

CONTROL ROD BLADE UNLATCHING TOOL

BACKGROUND

1. Field

Example embodiments relate to an unlatching tool and in particular to an unlatching tool for unlatching a control rod blade of a nuclear reactor. Example embodiments also relate to a method of unlatching a control rod blade of a nuclear reactor.

2. Description of the Related Art

FIG. 1 illustrates a simplified diagram of a typical boiling water reactor building 10. As shown in FIG. 1, a typical nuclear reactor building 10 houses, among other things, a crane 15, which may be used to move relatively heavy equipment in the reactor building 10. The reactor building 10 also houses a nuclear reactor pressure vessel 20 which includes a dome-shaped top head 25, a plurality of fuel assemblies 35, and a plurality of control rods 45. A top guide 30 is arranged over the fuel assemblies 35 and resembles a grid having a plurality of rectangular cells. At the bottom of the fuel assemblies 35 is a fuel support casting 40 and below the fuel support casting 40 are guide tubes 50 housing the control rod 45.

FIG. 2 illustrates a conventional control rod 45. As shown in FIG. 2, the typical control rod blade 10 includes four wings 45a, 45b, 45c, and 45d arranged in a cruciform shape. Each of the wings 45a, 45b, 45c, and 45d include a neutron absorbing material.

In a typical reactor assembly, the control rod 45 are arranged below the fuel assemblies 35 and are latched to control rod drives that enter the reactor pressure vessel through a housing welded to the bottom head of the reactor pressure vessel. The drives are basically hydraulic cylinders, operated by hydraulic control units. In operation, a control rod drive may move a control rod 45 upwards and between four fuel assemblies 35 in order to moderate/control the activity of the nuclear reactor.

FIG. 2 illustrates a detailed section of a bottom 46 of a control rod 45. The bottom 46 of the control rod 45 includes a velocity limiter 48, a coupling socket 47, and a D-handle 49. For maintenance purposes it may be desirable to unlatch the control rod 45 from their respective control rod drives. However, in order to unlatch the control rods 45 from the control rod drives, the control rod D-handle 49, located at the bottom of the control rod 45, must be accessed.

SUMMARY

Example embodiments relate to an unlatching tool and in particular to an unlatching tool for unlatching a control rod blade of a nuclear reactor. Example embodiments also relate to a method of unlatching a control blade of a nuclear reactor.

In accordance with example embodiments, an unlatching tool may include a baseplate, a first guide member and a second guide member attached to the baseplate, a first frame and a second frame attached to the baseplate, a stepper motor attached to the first frame, a worm drive attached to the first frame, a cable reel shaft attached to the worm drive, a hose wrapped around the cable reel shaft, and a hook attached to a first end of the hose, the hook including a cylindrical sleeve having at least one foldable finger configured to fold and unfold.

In accordance with example embodiments, a method of unlatching a control rod may include placing an unlatching tool on a top guide grid, the unlatching tool including a treble hook with a first foldable finger, a second foldable finger and a third foldable finger, or a single hook, lowering the treble hook to a D handle of the control rod, and unfolding the first foldable finger, the second foldable finger, and a third foldable finger, or a single hook such that at least two of the first foldable finger, the second foldable finger, and the third foldable finger engage different wings of the control rod and the foldable finger that does not contact the different wings of the control rod engages the D handle of the control rod or a single hook is aligned to engage the D handle.

BRIEF DESCRIPTION OF THE DRAWINGS

Example embodiments of the present invention will be more clearly understood from the following detailed description taken in conjunction with the accompanying drawings.

FIGS. 4A and 4B are views of a baseplate of an unlatching tool according to example embodiments;

FIGS. 15A and 15B are views of a treble hook with fingers deployed against a control rod in accordance with example embodiments.

DETAILED DESCRIPTION OF THE EXAMPLE EMBODIMENTS

Figure 1:
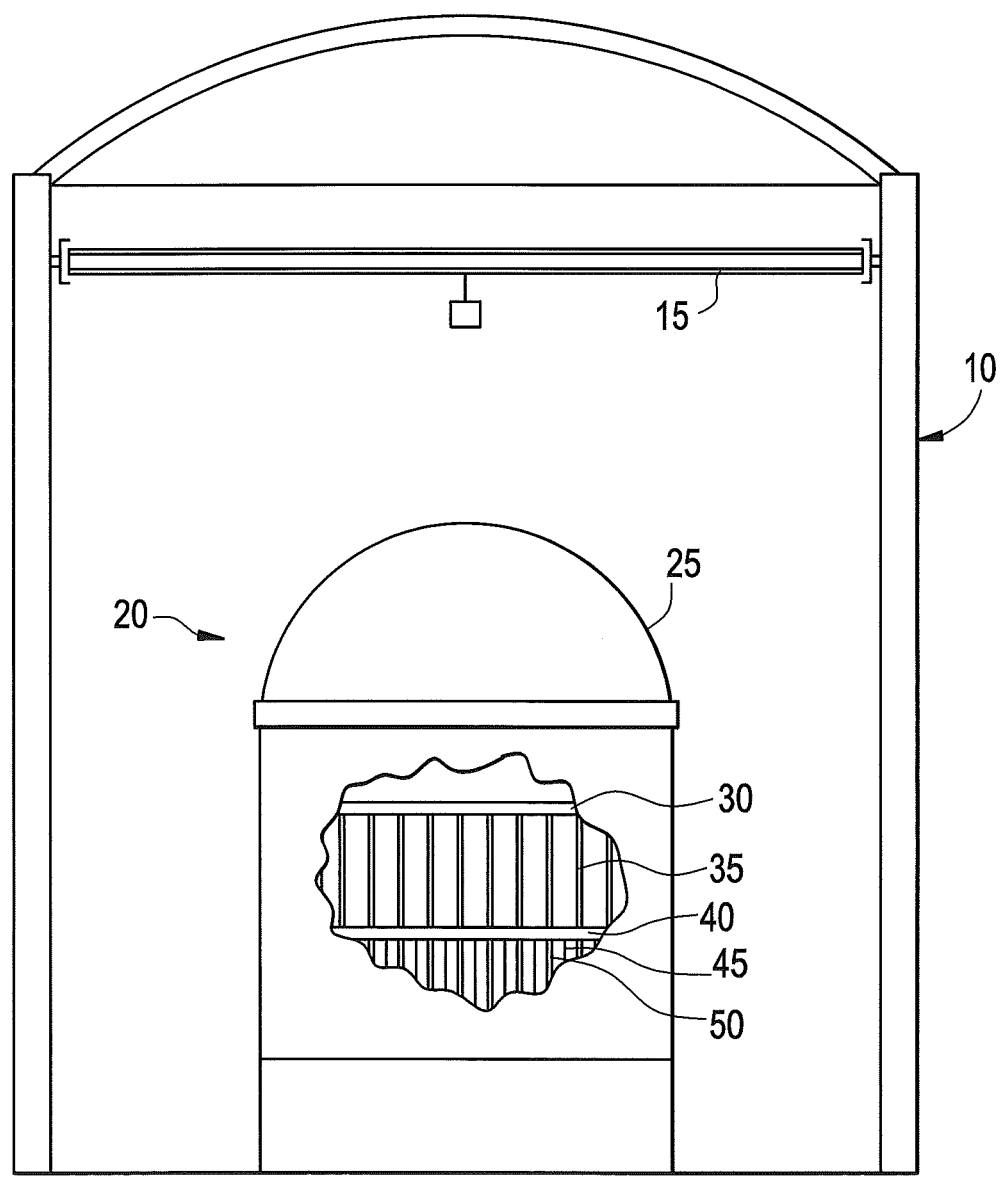
FIG. 1 is a simplified view of a typical boiling water reactor building.
Figure 2:
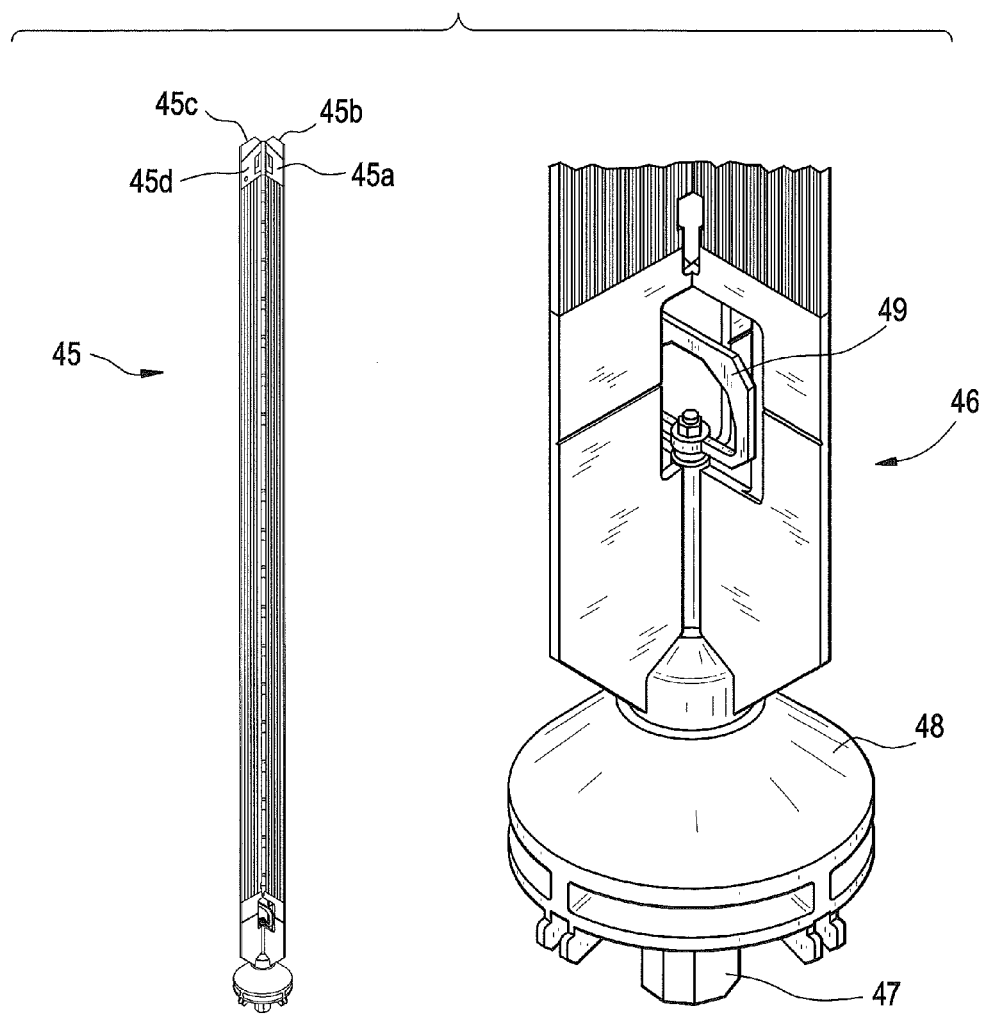
FIG. 2 is a view of a conventional control rod blade.

Example embodiments of the invention will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Figure 3:
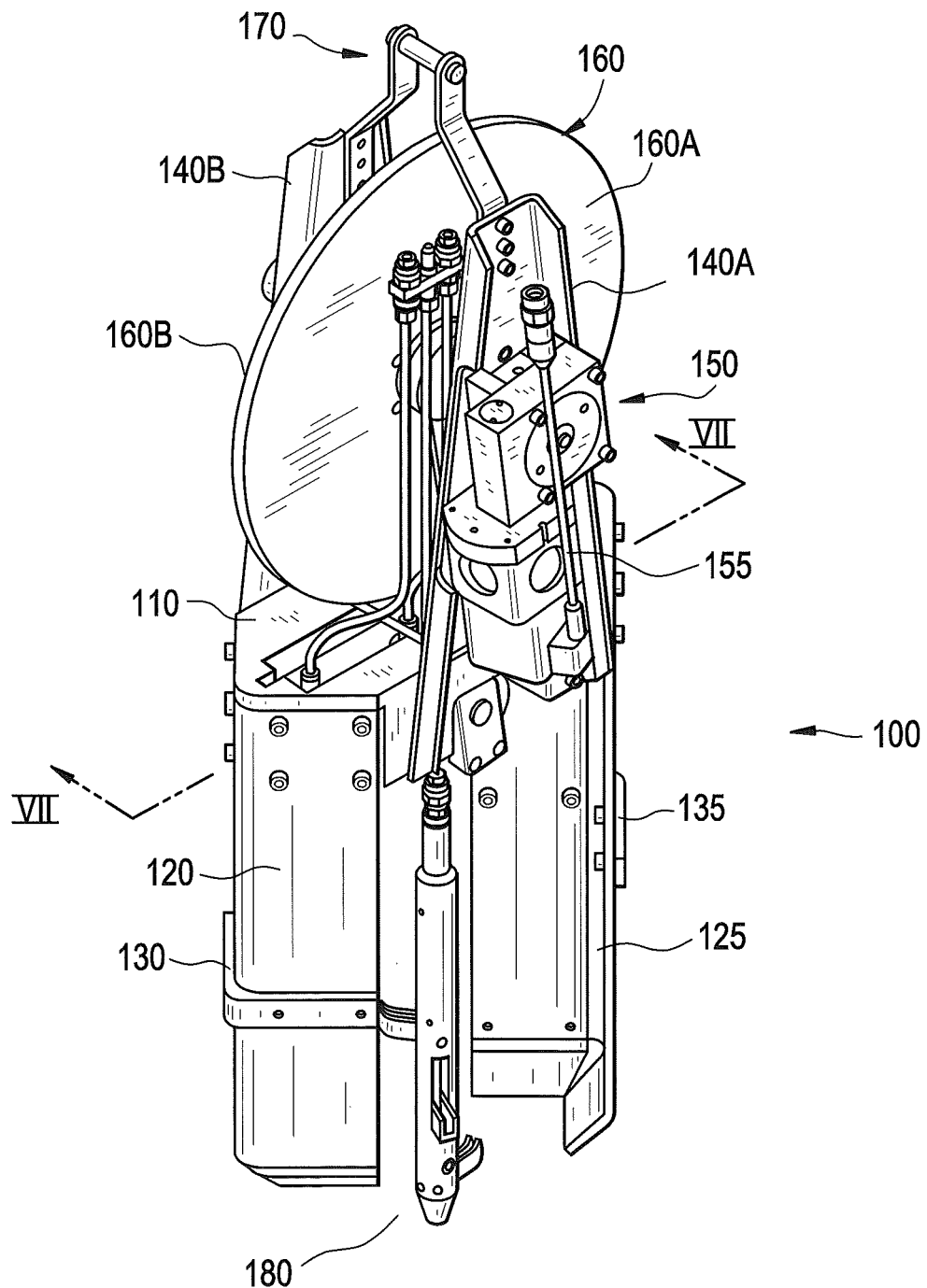
FIG. 3 is a view of an unlatching tool according to example embodiments.

FIG. 3 is a view of an unlatching tool 100 according to example embodiments. The unlatching tool 100 may include a baseplate 110, guide members 120 and 125, a first A-frame 140A, a second A-frame 104B, a cable reel 160 upon which a hydraulic hose 200 may be wrapped, a worm drive 150 which may be configured to rotate the cable reel 160, a stepper motor 155 which may be configured to track a position of the hydraulic hose 200, and a treble hook 180 which may be attached to an end of the hydraulic hose 200. Though not shown in FIG. 3, the unlatching tool 100 may further include a rotary union 1000 (see FIG. 13) to supply hydraulic fluid to the hydraulic hose 200. Although not shown, the hydraulic hose may be a twin hose to operate a double acting cylinder. This in turn would utilize a dual rotary union. The unlatching tool 100 may further include two parallel circular plates 160A and 160B, which may be used to form the cable reel 160, and a bail handle 170 which may be used to raise or lower the unlatching tool 100. The guide members 120 and 125 may respectively include guide stops 130 and 135 which may be configured to engage a grid within a nuclear reactor.

The baseplate 110 serves as a structural foundation for the unlatching tool 100 and provides a structure to which the guide members 120 and 125 and the A-frame members 140A and 140B attach. The A-frame members 140A and 140B in turn provide a structure for supporting the stepper motor 155, the worm drive 150, a reel shaft 400, the cable reel 160, and the rotary union 1000. The baseplate 110 is also configured so that the hydraulic hose 200 may move upwards and downwards as the cable reel 160 rotates. For example, the baseplate 220 includes a slot 111 through which the hydraulic hose 200 may traverse.

In greater detail, and referring to FIGS. 4A and 4B, the baseplate 110 may include a substantially flat upper horizontal surface 118. FIG. 4A represents a top view of the baseplate 110 whereas FIG. 4B represents an isometric view of the baseplate 110 as viewed from below. The upper surface 118 may be bounded by six edges 110a, 110b, 110c, 110d, 110e, and 110f. Thus, the upper surface 118 may resemble an elongated hexagon. As shown in FIG. 4A, a first end of the baseplate 110 may be defined by the edges 110b and 110c and a second end of the baseplate 110 may be defined by the edges 110e and 110f. In example embodiments, the edges 110b and 110c may form about a ninety (90) degree angle and the edges 110e and 110f may likewise form an angle of about ninety (90) degrees. A slot 111 may be formed through the upper surface 118. As shown in FIG. 4A, the slot 111 may be irregularly shaped and may be larger at one end 111a of the slot 111 than at another end 111b of the slot 111. The slot end 111a may be configured to allow the hydraulic hose 200 to pass there through as well as provide a viewing path through the baseplate.

Below the upper surface 118 of the baseplate 110 are two structures 112 and 116 as shown in FIG. 4B. Structure 112 may be formed under the first end of the baseplate 110 and the second structure 116 may be formed under the second end of the baseplate 110. The first structure 112 may be comprised of five (5) plate-like members 112a, 112b, 112c, 112d, and 112e that extend in a direction substantially perpendicular to the upper surface 118. The plate-like members 112a and 112b may be substantially in line with, or parallel with edges 110b and 110c, respectively, and edges 112c and 112d may be in line with or parallel with edges 110a and 110d, respectively. The fifth member 112e may connect to the plate-like members 112c and 112d and may extend in a direction substantially perpendicular to a direction in which the plate-like members 112c and 112d extend.

As described above, the second structure 116 may be formed under the second end of the baseplate 110. The second structure 116 may be comprised of six (6) plate-like members 116a, 116b, 116c, 116d, 116e, and 116f that extend in a direction substantially perpendicular to the upper surface 118. The plate-like members 116a and 116b may be substantially in line with, or parallel with edges 110e and 110f, respectively, and edges 116c and 116f may be in line with or parallel with edges 110a and 110d, respectively. The plate-like members 116d and 116e may connect to the plate-like members 116c and 116f, respectively and may extend in a direction substantially perpendicular to a direction in which the plate-like members 116c and 116f extend. As is evident from FIG. 4B, there is a gap between the plate-like members 116d and 116e, thus plate-like members 116d and 116e allow for a member/component to traverse in a direction along a length of the baseplate 110 from the second end of the base plate 110 towards a center of the baseplate 110.

In example embodiments, the guides 120 and 125 resemble angle iron having an L-shaped cross-section. The guides 120 and 125, for example, may have a length of about twenty (20) inches with leg lengths of approximately four (4) inches. The guide 120 may, for example, be attached to the plate-like members 112a and 112b of the first structure 112 of the baseplate 110 via bolting. However, example embodiments are not limited thereto as the guide 120 could be attached to plate-like members 112a and 112b of the first structure 112 by welding or rivoting. Similarly, the guide 125 may be attached to the plate-like members 116a and 116b of the second structure 116 of the baseplate 110 via bolting. However, example embodiments are not limited thereto as the guide 125 could be attached to plate-like members 116a and 116b of the second structure 116 by welding or rivoting.

Although FIG. 3 illustrates the first and second guides 120 and 125 as having the same length, example embodiments are not limited thereto as one of the first and second guides 120 and 125 may be longer than the other.

Figure 5:
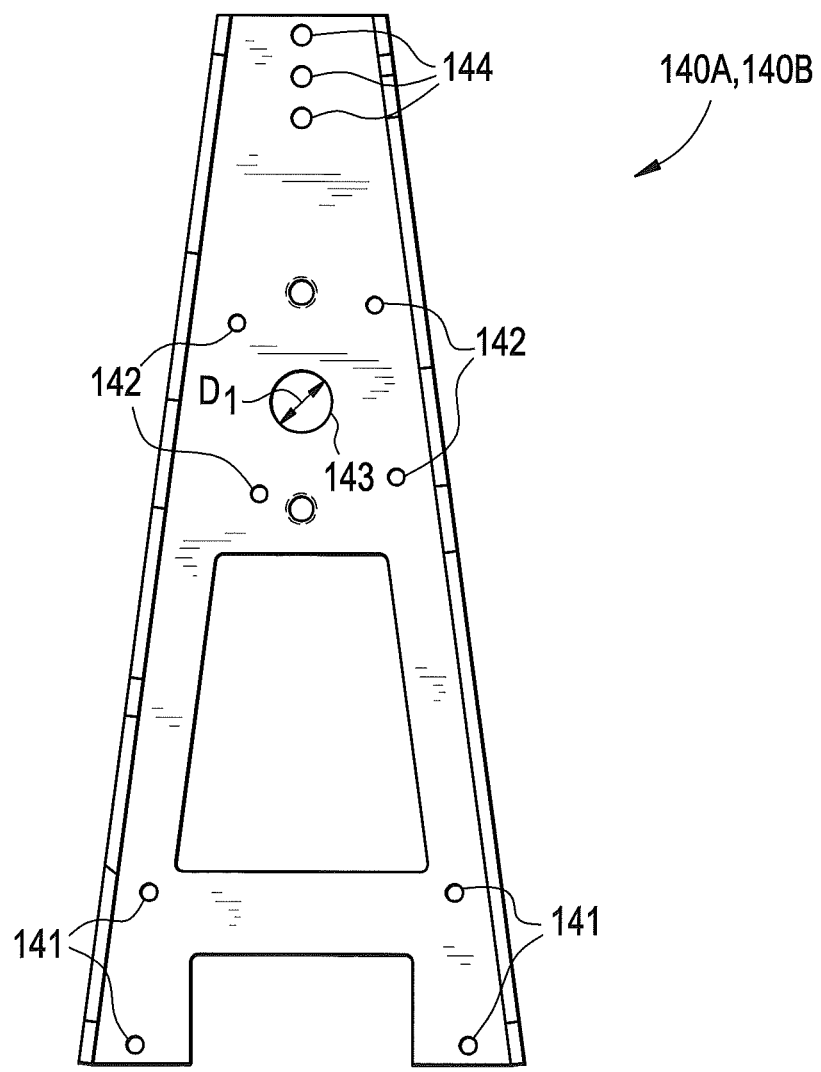
FIG. 5 is a view of an A-frame of an unlatching tool according to example embodiments.

FIG. 5 illustrates the A-frame 140A. Because the A-frame 140A is similar to the A-frame 140B, for the sake of brevity, only features of the A-frame 140A will be discussed. As shown in FIG. 5, the A-frame 140A may include a plurality of holes 141 which may be spaced so as to correspond to the holes 141* formed in the baseplate 110. Accordingly, the A-frame 140A may be attached to the baseplate 110 by bolting the A-frame 140A to the baseplate 110 using the holes 141 and 141*. The A-frame 140A also includes a plurality of holes 142 which may be used to bolt the worm drive 150 to the A-frame 140A. The A-frame 140A may also include a hole 143 which may be used to allow a reel shaft 400 to connect to and be driven by the worm drive 150. The reel shaft 400, upon rotation, may cause the hydraulic hose 200 to wrap or unwrap around the cable reel 160. The A-frame 140A may also include a plurality of holes 144 which may be used to bolt the bail handle 170 to the A-frame 140A.

Figure 6A:
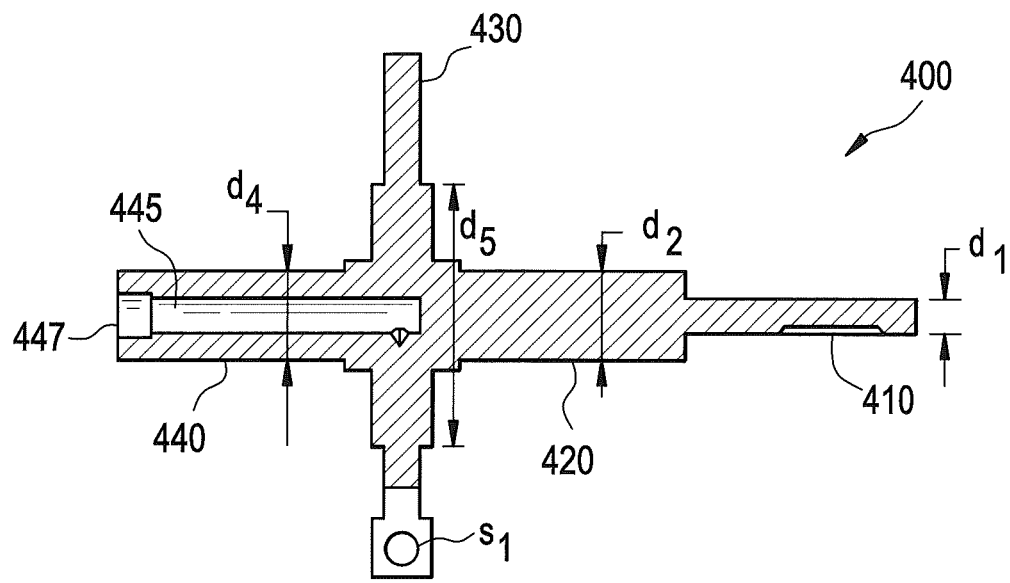
FIGS. 6A and 6B are views of a reel shaft of an unlatching tool according to example embodiments.
Figure 6B:
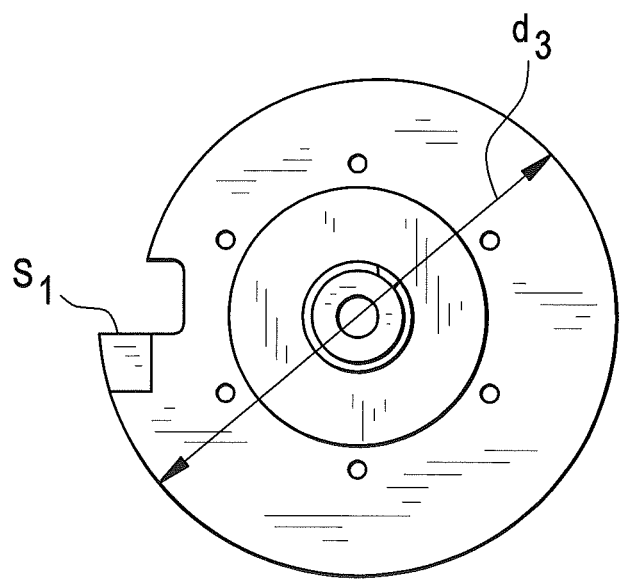

FIGS. 6A and 6B are views of a reel shaft 400 that may be used with the unlatching tool 100 of example embodiments. As shown in FIG. 6A, the reel shaft 400 may have a stepped shaft configuration with a first stepped portion 410 having a first diameter d1, a second stepped portion 420 having a second diameter d2, a third stepped portion 430 having a variable diameter d3 (see FIG. 6B), and a fourth stepped portion 440 having a diameter d4. In example embodiments the first stepped portion 410 may be configured to engage the worm drive 150 and the second and fourth stepped portions 420 and 440 may be configured to insert through the holes 143 of the A-frames 140A and 140B so that the reel shaft 400 is supported by the A-frames 140A and 140B. Thus, the diameters d2 and d4 of the second and fourth stepped portions 420 and 440 should be slightly smaller than the diameter D1 of the hole 143.

The fourth stepped portion 410 may include an end 447 configured to receive hydraulic fluid from the aforementioned rotary union 1000. The fourth stepped portion 410 may also include a first hollow channel 445 which may provide the hydraulic fluid from the rotary union 1000 to the third stepped portion 430. The third stepped portion may include a second hollow channel (not shown) which provides fluid communication between the hollow channel 445 and a surface S1 which is configured to connect to the hydraulic hose 200. Thus, hydraulic fluid may enter the reel shaft 400 through the first hollow channel 445 and may traverse through the second hollow channel to the surface S1 that may be connected to the hydraulic hose 200. In example embodiments the hydraulic hose 200 may wrap around the third stepped portion when the reel shaft 400 rotates.

In example embodiments, the third stepped portion 430 includes a sub-stepped portion having a diameter d5. In example embodiments, the two parallel plates 160A and 160B may be annular shaped and each of the plates may have an inner diameter that is slightly larger than the diameter d5, and an outer diameter which is larger than the largest diameter d3. Thus, the two parallel plates 160A and 160B may be arranged on the sub-step portion of the sides of the third stepped portion 430. Accordingly, the two parallel plates 160A and 160B may prevent the hydraulic hose 200 from slipping off of the third stepped portion 430 as the shaft 400 rotates.

Figure 7:
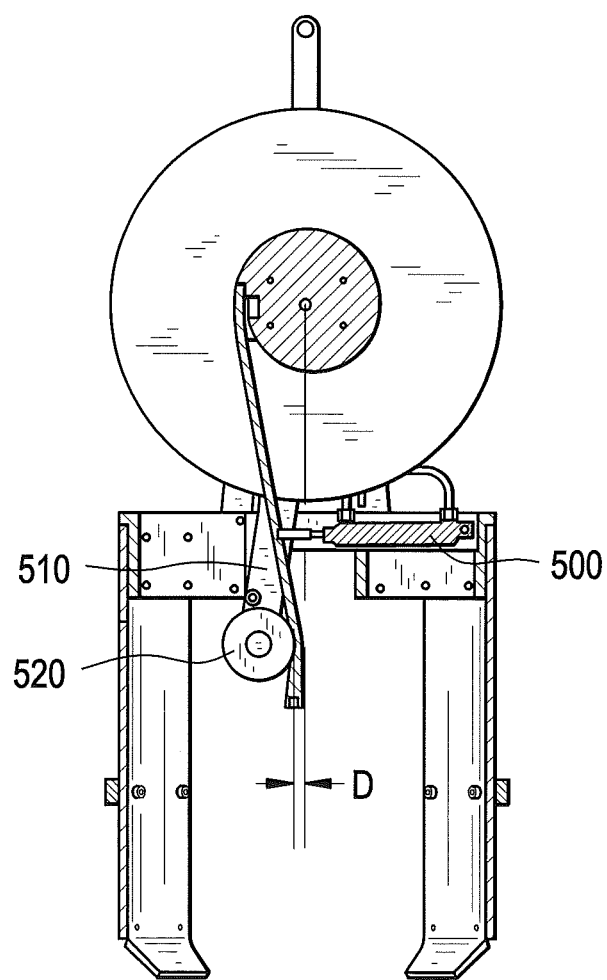
FIG. 7 is a view of an unlatching tool according to example embodiments.

FIG. 7 shows a section view of the unlatching tool 100 in accordance with example embodiments. In addition to the aforementioned elements; the unlatching tool also includes an arm 510 pivotably attached to the A-frame 104A. As shown in FIG. 7, the arm 510 includes a wheel 520 configured to engage the hydraulic hose 200. FIG. 7 also shows a cylinder 500 which may have one end attached to the arm 510 and another end attached to the baseplate 110. The cylinder 500 may be used to move the arm 510 backwards and forwards thus finely positioning the hydraulic hose 200. In addition, the cylinder 500 may be configured with a pressure sensor in order to determine whether the hydraulic hose 200 with the treble hook 180 has engaged a D-handle of a control rod. For example, if the D-handle has been engaged, the hydraulic hose 200 will be in a tensioned state thus causing the wheel 520 to move away from the cylinder 500 placing the cylinder 500 in tension. Accordingly, a pressure sensor placed on the pressure line connected to the cylinder 500 may determine whether or not the D-handle has been engaged by sensing whether or not the cylinder 500 is in tension.

Figure 8A:
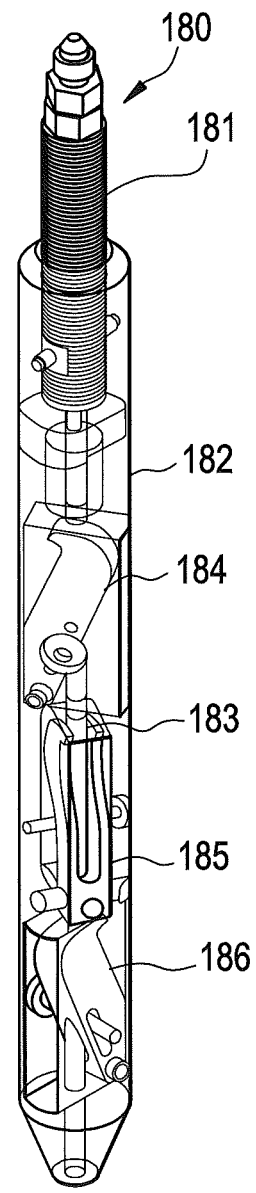
FIGS. 8A and 8B are views of treble hook according to example embodiments.
Figure 8B:
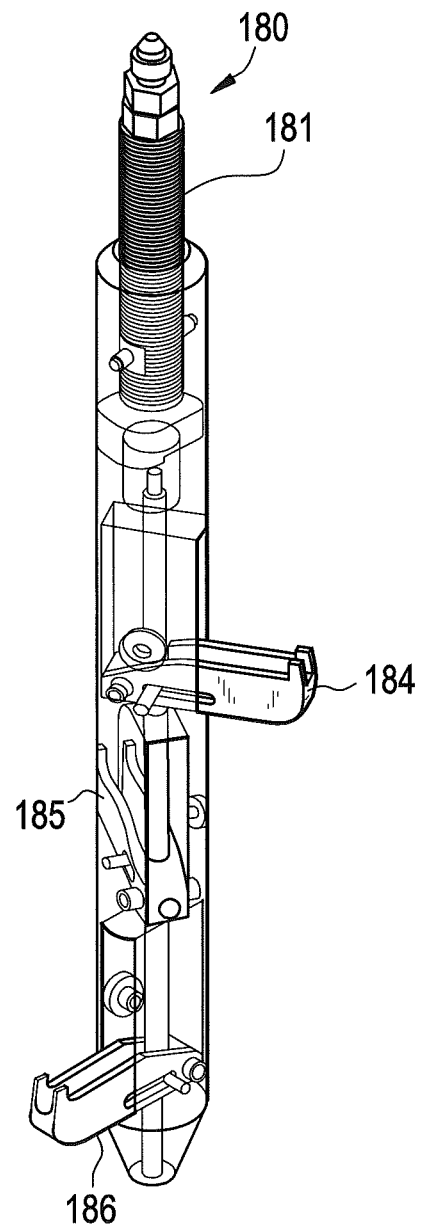

FIGS. 8A and 8B represent a detailed example of the treble hook 180 with FIG. 8A illustrating a folded configuration and FIG. 8B illustrating an unfolded configuration. As shown in FIGS. 8A and 8B, the treble hook 180 is comprised of a hydraulic cylinder 181, a hook rod 183, three fingers 184, 185, and 186, and a sleeve 182. In example embodiments, the sleeve 182 may be cylindrical, however, example embodiments are not limited thereto. Also, the use of just one or two fingers can be accommodated. As shown, the cylinder is a single acting cylinder with a spring return, but it could utilize a double acting cylinder, which in turn would need a twin hose assembly. A first end of the hook rod 183 may be connected to the hydraulic cylinder 181. Thus, as the hydraulic cylinder 181 is actuated, the hook rod 183 may move through the sleeve 182. The fingers 184, 185, and 186 may have ends pinned within the sleeve 182 and the ends may be pinned at different elevations. In addition, the fingers may be arranged so that, in an unfolded state, the fingers 184, 185, and 186 form projections which are spaced 180 degrees apart. The fingers 184, 185, and 186 may include slots which interact with protrusions protruding from the hook rod 183. The sleeve 182 may at least partially enclose the hydraulic cylinder 181 and may entirely enclose the hook rod 183, and the three fingers 184, 185, and 186.

Figure 9:
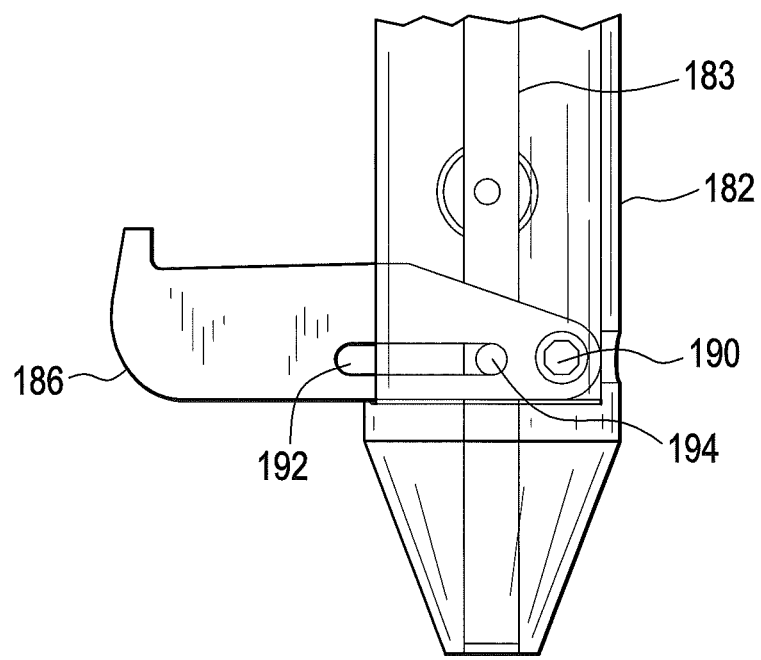
FIG. 9 is a close-up view of a treble hook according to example embodiments.

FIG. 9 is a detailed drawing showing the arrangement of the third finger 186 within the sleeve 182. Referring to FIG. 9, the third finger 186 may be pinned to the sleeve 182 via the pin 190. The third finger 186 also includes a slot 192 which interacts with a protrusion 194 extending from the hook rod 183. In the event the hook rod 183 is drawn upwards, for example, due to an upward movement of the hydraulic cylinder 181, the protrusion 194 applies an upward force to the finger 183 at the slot 192 thus causing the third finger 186 to rotate into the sleeve 183 to obtain a folded state. Conversely, a downward movement of the hook rod 182 will cause the finger 186 to unfold. The fingers 183 and 184 may be similarly connected to the hook rod 183 and the sleeve 182 and may therefore function similarly, accordingly, a detailed discussion of the kinematics of these fingers is omitted for the sake of brevity.

Although a treble hook 180 including three fingers 184, 185, and 186 has been described, example embodiments are not limited thereto. For example, a hook 180 may include more than three fingers or less than three fingers. For example, in the event the hook includes only one finger, the hook would include a hook rod with a protrusion that engages a slot of only a single finger. Other than that, the hook with the single finger would be identical to the above described treble hook.

As described above, an unlatching tool 100, according to example embodiments, may include a baseplate 110 with guide members 120 and 125 attached thereto. The guide members 120 and 125 may include guide stops 130 and 135 which may be configured to engage a grid within a conventional nuclear power plant. The baseplate 110 also supports, via A-frames 140A and 140B, a stepper motor 155 and a worm drive 150. The baseplate 110 further supports, via the A-frames 140A and 140B, a reel shaft 400 supporting a hydraulic hose 200. In example embodiments, the reel shaft 400 may be connected to the worm drive 150 and the worm drive may rotate the reel shaft 400. The hydraulic hose 200 may be wrapped around the reel shaft 400. One end of the hydraulic hose 200 may be connected to the reel shaft 400 and another end of the hydraulic hose 200 may be connected to a treble hook 180.

In example embodiments, hydraulic fluid may be provided to the treble hook via the rotary union 1000, the reel shaft 400, and the hydraulic hose 200. For example, in example embodiments, the rotary union 1000 may be connected to one end of the reel shaft 400 which may be configured with the first hollow channel 445. The first hollow channel 445 may be in fluid communication with a second hollow channel which may in turn terminate at a surface S1 connected to the hydraulic hose 200. Thus, hydraulic fluid provided by the rotary union 1000 may flow through the first hollow channel 445 and through the second hollow channel and then to the hydraulic hose 200. The hydraulic fluid may then pass through the hydraulic hose 200 and to the treble hook 180. The hydraulic fluid may then cause the hydraulic cylinder 181 within the treble hook 180 to move the hook rod 183 thus actuating the fingers 184, 185 and 186.

In example embodiments, the treble hook 180 may be move upwards or downwards by the rotation of the reel shaft 400. Because the rotation of the reel shaft 400 is controlled by the worm drive 150, the worm drive 150 controls the vertical movement of the treble hook 180. The stepper motor 155 may be used to track the movement of the worm drive 150. Thus the stepper motor 155 may provide feedback to a user regarding how far the treble hook 180 has moved.

In example embodiments, the hydraulic hose 200 may engage a wheel 520 that may be attached to an arm 510 that may in turn have a first end that may be pivotably connected to one of the A-frames 140A and 140B. The arm 510 may also be attached to a cylinder 500 that may be connected to the baseplate 110. The cylinder may expand or contract and thus may be able to laterally position/reposition the hydraulic hose 200. The cylinder 500 may include a pressure sensor that may determine whether the cylinder 500 is in tension or in compression. Whether or not the cylinder 500 is in tension or compression may depend on whether the treble hook 180 is engaged with a D-handle of a control rod 45. Thus, the cylinder 500 serves a dual purpose of positioning the hydraulic hose 200 and determining whether the treble hook is engaged with a D of a control rod 45.

Figure 10:
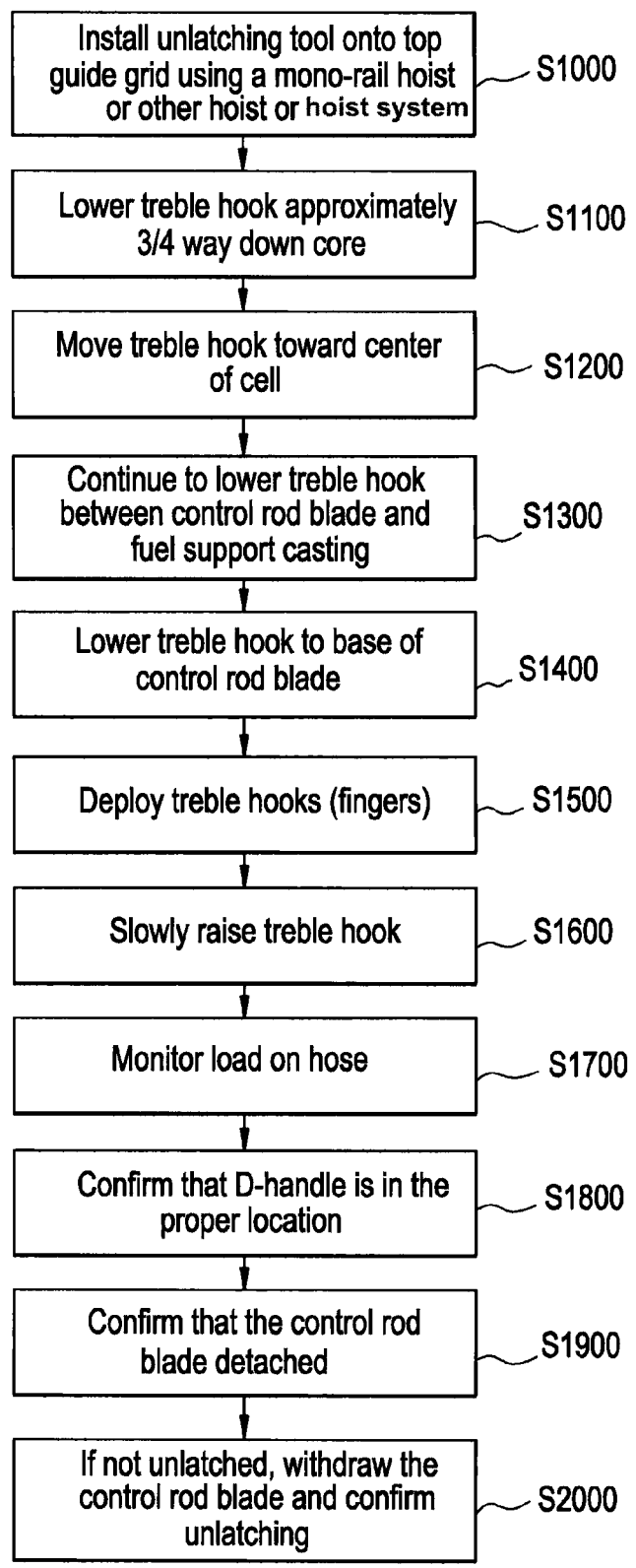
FIG. 10 is a flowchart for unlatching a control rod in accordance with example embodiments.

The unlatching tool 100 may be used to unlatch a control rod blade from a control rod drive. FIG. 10 illustrates a flowchart detailing the operations that may be used for unlatching a control rod blade from a control rod drive using the unlatching tool 100. These operations take advantage of existing structure that are typically found in a conventional nuclear power plant, for example, the crane 15, the top guide 30, and the fuel support casting 40 along with the conventional control rod 45.

Figure 11:
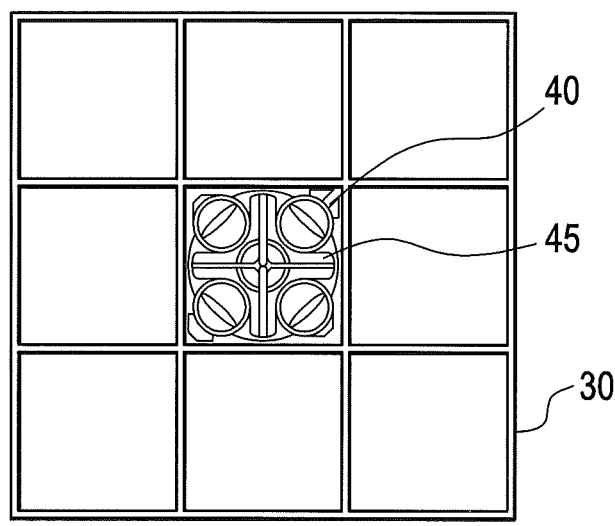
FIG. 11 is a top view of a control rod and a support casting as viewed through a grid in accordance with example embodiments.

FIG. 11 illustrates a top view of a control rod 45 and a support casting 40 when viewed through the top guide 30. For simplicity only a single control rod 45 and support casting 40 are shown.

Figure 12:
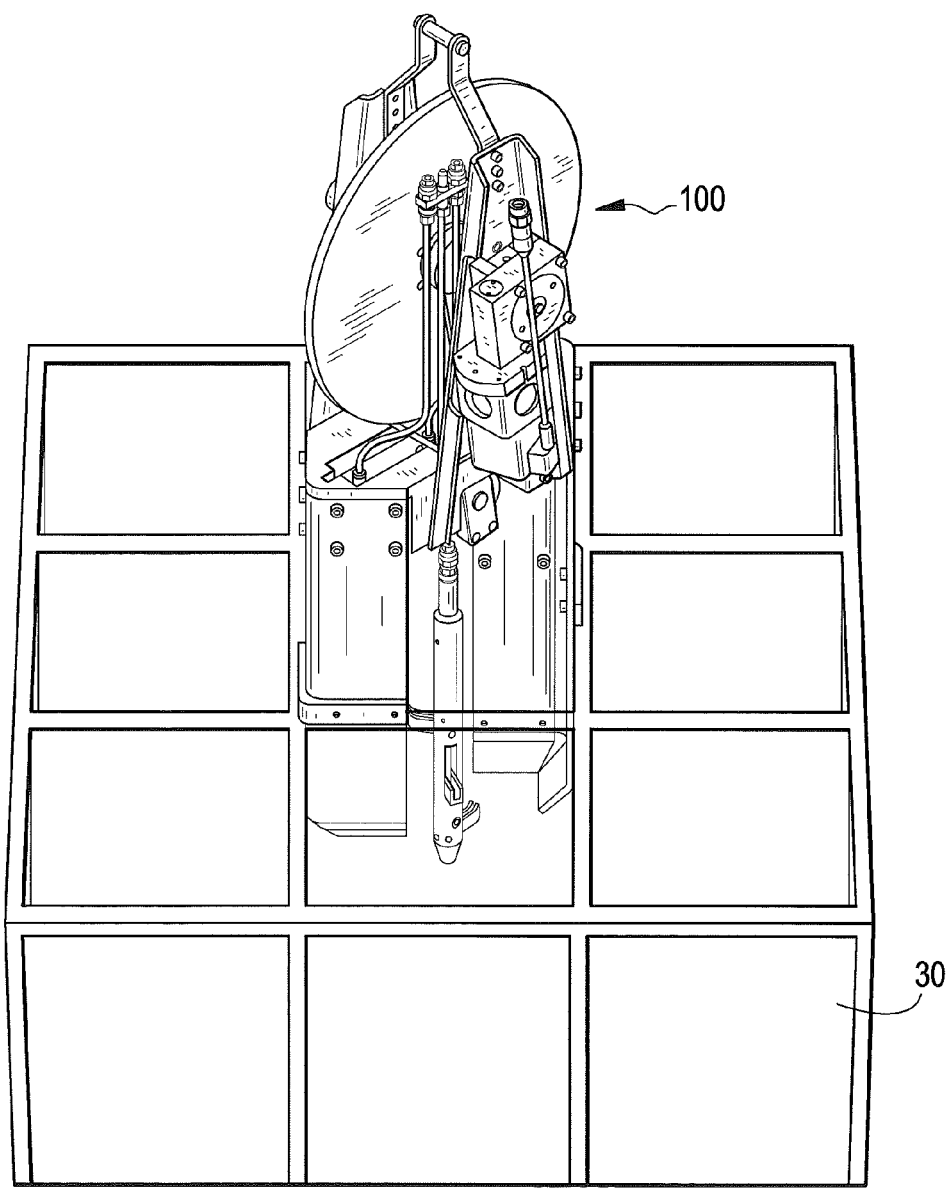
FIG. 12 is a view of an unlatching device engaged with a grid in accordance with example embodiments.

FIG. 12 illustrates an operation of moving the unlatching tool 100 over and above a cell within the grid 30 (S1000). This operation involves using a mono-rail hoist or other hoist system, for example, the crane 15 illustrated in FIG. 1, to move the unlatching tool 100 above the cell. Using the guide members 120 and 125, the unlatching tool 100 may be lowered into the cell via the monorail hoist system.

Figure 13:
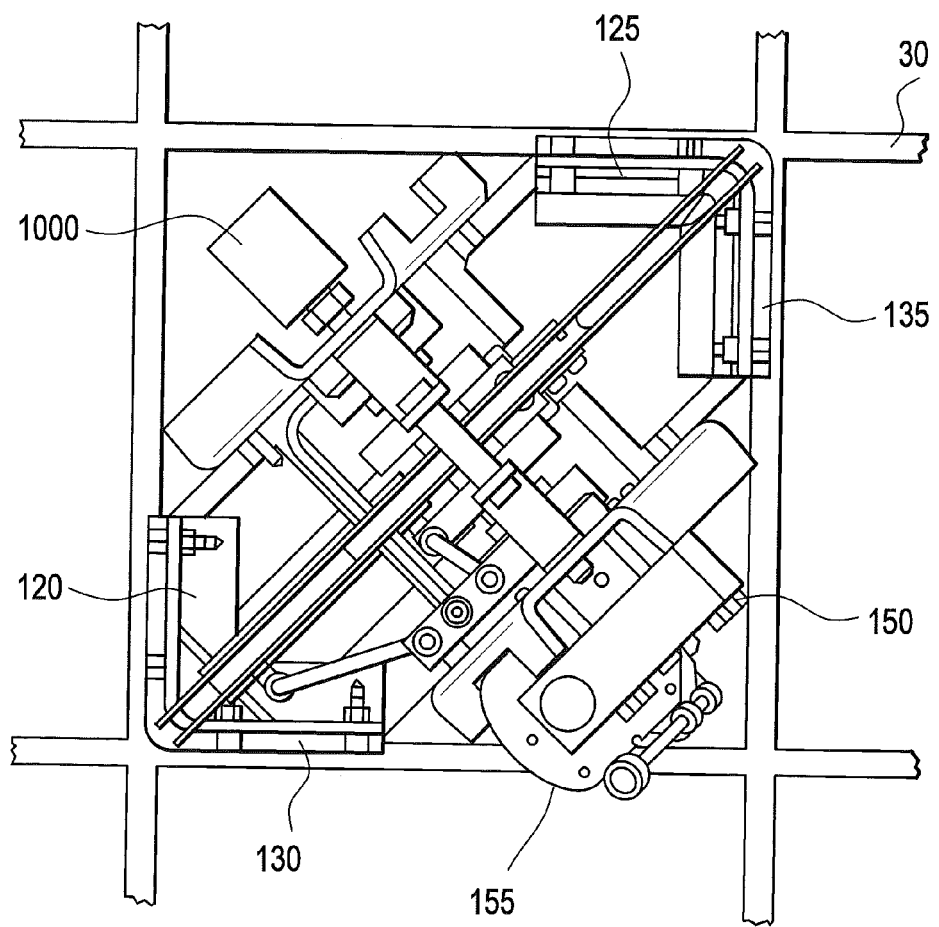
FIG. 13 is a top view of an unlatching device engaged with a grid in accordance with example embodiments.

In example embodiments, the unlatching tool 100 may be configured to be supported by a cell of the top guide 30. For example, FIG. 13 illustrates an unlatching tool 100 installed in a cell of the top guide 30. As shown in FIG. 13, the guides 120 and 125 may be configured to nearly touch inside surfaces of the cell, however, the unlatching tool 100 is prevented from passing completely through the cell by the guide stops 130 and 135 provided on outside surfaces of the guides 120 and 125. Thus, as shown in FIG. 13, bottom surfaces of the guide stops 130 and 135 contact top surfaces of the grid 30 allowing for the unlatching tool 100 to be stably supported by the grid 30.

Figure 14A:
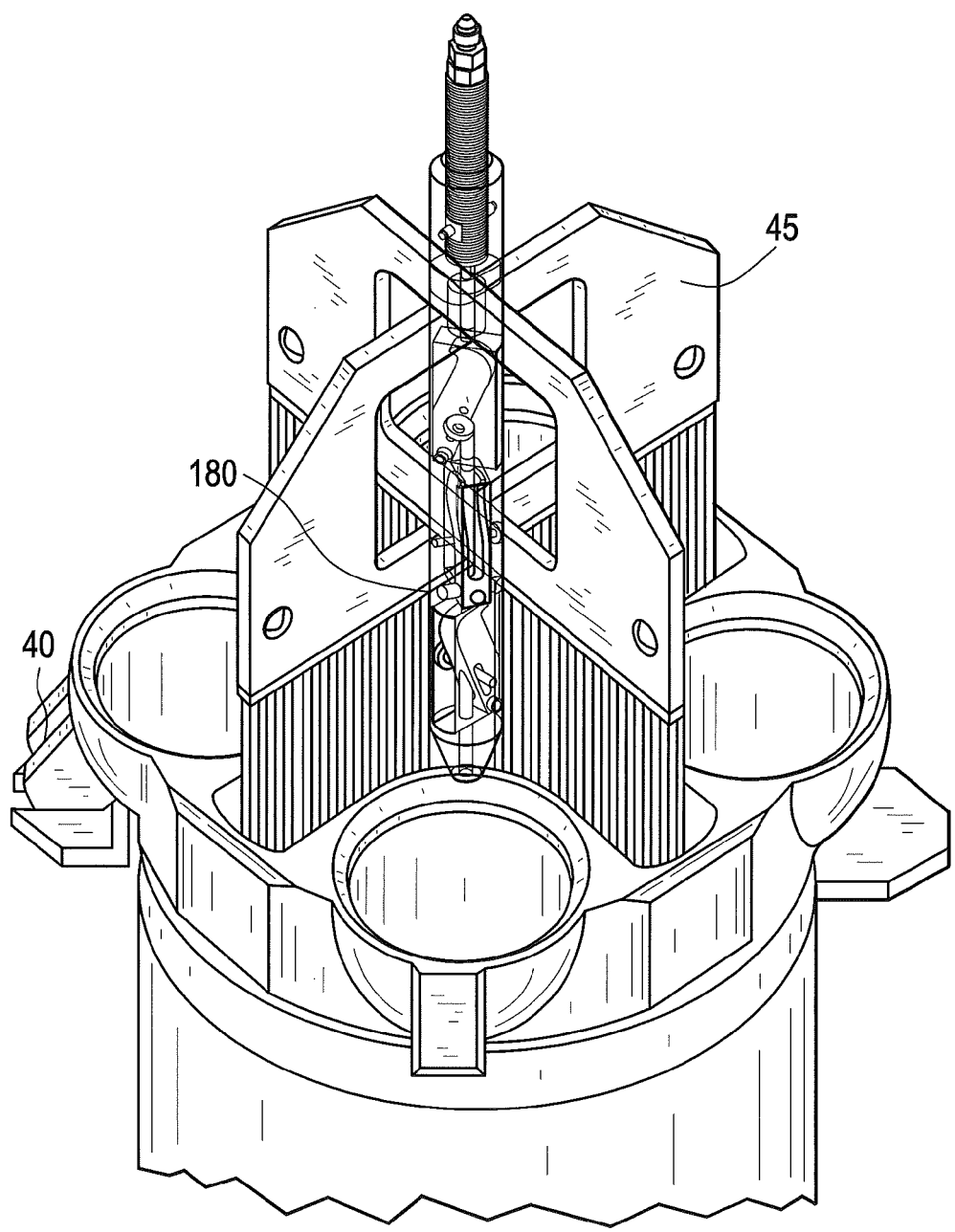
FIGS. 14A and 14B are views of a treble hook being lowered between a control rod and a support casting in accordance with example embodiments.
Figure 14B:
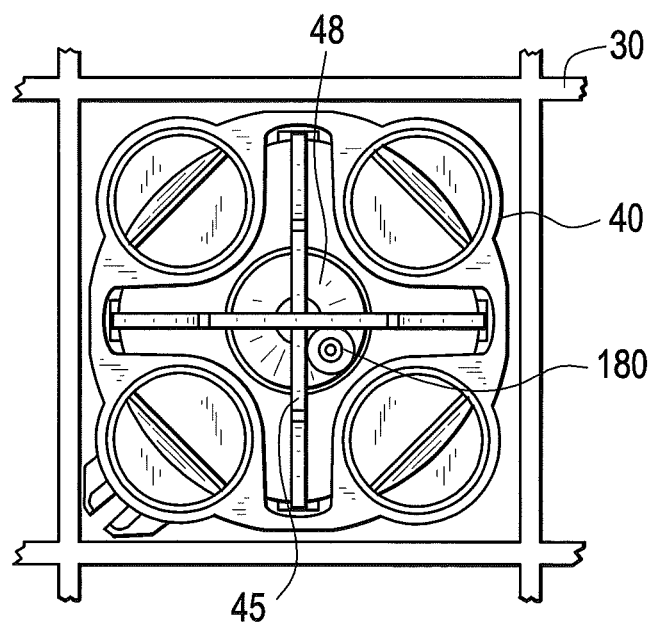

After the unlatching tool 100 has been moved to the grid 30, the worm drive 150 may be operated and the cable reel 160 may be rotated to lower the treble hook 180 below the grid. The treble hook 180 may be lowered, for example, approximately ¾ of the way down to the core before any repositioning of the treble hook 180 (S1100). The travel distance of the treble hook may be monitored by an operator using the stepper motor 155. Thus, an operator will have data available, via the stepper motor 155, regarding the position of the treble hook 180. After the treble hook 180 has been lowered approximately ¾ of the way down the core, the treble hook 180 may be repositioned towards the center of the cell so that the treble hook 180 may pass between the control rod 45 and the support casting 40 (S1200). The treble hook 180 may be repositioned by extending or contracting the cylinder 500 which is coupled to the baseplate 110 and the arm 510. FIGS. 14A and 14B illustrate an example of the treble hook 180 being repositioned near the center of the cell with FIG. 14A representing an isometric view and FIG. 14B representing a top view. As shown in FIGS. 14A and 14B, the treble hook 180 may be moved to a region in the cell where it can be lowered between the support casting 40 and the control rod 45.

After the treble hook 180 has been moved towards the center of the cell, the treble hook 180 may moved downwards between the control rod 45 and the support casting 40 (S1300). In example embodiments, the treble hook 180 may be very near a corner formed by two wings of the control rod 45. The treble hook 180 continues to move until it reaches the base of the control rod 45 (S1400). At this time, the fingers 184, 185, and 186 of the treble hook 180 may be deployed (S1500). FIGS. 15A and 15B show an example of the treble hook 180 being arranged near the bottom of the control rod 45. In example embodiments, the fingers 184, 185, and 186 may be employed by providing hydraulic fluid to the hydraulic cylinder 181 of the treble hook 180. The hydraulic fluid may be provided by the rotary union 1000 which may provide the hydraulic fluid to the a reel shaft 400 which may in turn provide the hydraulic fluid to the hydraulic hose 200 which may in turn provide the hydraulic fluid to the hydraulic cylinder 181.

After the fingers 184, 185, and 186 are deployed, the treble hook 180 may be slowly raised by operating the worm drive 150 to rotate the reel shaft 160 (S1600). Because the fingers 184, 185, and 186 may be oriented 120 degrees with respect to one another, two of the three fingers may contact two of the wings of the control rod 45 and the third finger may align with a center of the control rod 45 (see FIG. 15B). Thus, as the treble hook 180 is raised, the finger not in contact with the wings of the control rod 45 engages with the D-handle of the control rod 45. As the treble hook 180 is raised, the load on the hose is monitored by the cylinder 500 (S1700) and the position is determined by the stepper motor 155 (S1800). If the cylinder 500 determines the hydraulic hose 200 is in tension it is determined that the D-handle has been engaged and the control rod 45 has been unlatched (S1900). In the event it is determined that the control rod 45 has not been unlatched, a withdrawal sequence involving an upward motion of about two (2) to about three (3) inches before a downward motion is made is executed (S2000). During this operation, the hose tension shall be maintained by monitoring the pressure in the cylinder 500 and adjusting the stepper motor.

In the above example embodiment, a treble hook with three fingers 184, 185, and 186 is employed, however, example embodiments are not limited thereto. For example, rather than using a treble hook with three fingers, a single hook with one foldable finger may be used. In this latter example embodiment, the hose may be configured to keep the single hook aligned with the D-handle. In this case, the hose could be a hydraulic hose which does not twist, for example, a twin hose for a "flat" hose. In addition, the process may be implemented with the aid of a remote control camera system (GEROCS) in order to aid in the positioning of any of the aforementioned unlatching tool components.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed:

1. An unlatching tool for extracting a control rod from a support casting of a nuclear reactor, comprising:
   a baseplate;
   at least one guide member vertically extending below the baseplate;
   a frame attached to the baseplate;
   a rotatable cable reel shaft connected to the frame;
   a worm drive configured to rotate the cable reel shaft;
   a stepper motor configured to power the worm drive;
   a hose wrapped around the cable reel shaft, the cable reel shaft being configured to lower a distal end of the hose below the baseplate and the guide member; and
   a hook attached to the distal end of the hose, the hook including a vertically-oriented cylindrical sleeve with more than one foldable finger,
   the foldable fingers having a retracted position where each of the fingers is held in a vertically-oriented position within the cylindrical sleeve, and an extended position where each of the fingers is horizontally extended from the cylindrical sleeve at different axial elevations from each other.

2. The unlatching tool according to claim 1, wherein the hook includes a hydraulic cylinder and a hook rod connected to the hydraulic cylinder, and the more than one finger includes a first finger, a second finger, and a third finger, and the hook rod includes protrusions engaging slots of the first finger, the second finger, and the third finger.

3. The unlatching tool according to claim 2, wherein the extended fingers extend radially from the cylindrical sleeve to be about equidistantly spaced at approximately 120 degrees from each other.

4. The unlatching tool of claim 1, further comprising:
   a rotary union configured to provide hydraulic fluid to the hook.

5. The unlatching tool of claim 4, wherein
   the cable reel shaft includes a first hollow channel configured to receive the hydraulic fluid from the rotary union and a second hollow channel configured to provide fluid communication between the first hollow channel and the hose to transfer the hydraulic fluid to the hose.

6. The unlatching tool of claim 1, further comprising:
   an arm having a first end pivotably connected to the frame, and a second end supporting the cable reel shaft;
   a wheel attached to the cable reel shaft, the wheel configured to contact the hose; and
   a cylinder having a first end attached to the baseplate and a second end attached to a second end of the arm, the cylinder being configured to adjust a location of the hose.

7. The unlatching tool of claim 6, wherein the cylinder includes a sensor to determine whether the cylinder is in one of tension and compression.

8. The unlatching tool of claim 1, wherein the at least one guide member includes a first guide member and a second guide member, further comprising:
   a first guide stop attached to the first guide member; and
   a second guide stop attached to the second guide member.

9. The unlatching tool of claim 8, wherein the first guide member and the first guide stop have an L-shaped cross-section, and the second guide member and the second guide stop have an L-shaped cross-section.

* * * * *